(12) United States Patent
Barman et al.

(10) Patent No.: US 8,098,955 B2
(45) Date of Patent: Jan. 17, 2012

(54) EFFICIENT SELECTION AND APPLICATION OF REGIONS OF INTEREST IN DIGITAL IMAGING

(75) Inventors: Roderick A. Barman, Vancouver (CA); Stewart Kingdon, Richmond (CA); Malcolm Steenburgh, Delta (CA)

(73) Assignee: Point Grey Research Inc., Richmond (CA)

( * ) Notice: Subject to any disclaimer, the term of this patent is extended or adjusted under 35 U.S.C. 154(b) by 967 days.

(21) Appl. No.: 12/055,193

(22) Filed: Mar. 25, 2008

(65) Prior Publication Data

US 2009/0245637 A1 Oct. 1, 2009

(51) Int. Cl.
*G06K 9/20* (2006.01)
(52) U.S. Cl. ........................................ 382/282; 382/312
(58) Field of Classification Search .................. None
See application file for complete search history.

(56) References Cited

U.S. PATENT DOCUMENTS

| | | | | |
|---|---|---|---|---|
| 5,128,776 A | * | 7/1992 | Scorse et al. | 382/240 |
| 6,512,858 B2 | * | 1/2003 | Lyon et al. | 382/305 |
| 6,606,422 B1 | * | 8/2003 | Dulin et al. | 382/282 |
| 7,148,914 B2 | * | 12/2006 | Bronson | 348/207.1 |

OTHER PUBLICATIONS

Moghaddam, Baback et al., "Regions-of-Interest and Spatial Layout for Content-Based Image Retrieval", MERL—A Mitsubishi Electric Research Laboratory, TR-2000-35, Nov. 2000, pp. 1-9.

* cited by examiner

*Primary Examiner* — Brian Werner
(74) *Attorney, Agent, or Firm* — Oyen Wiggs Green & Mutala LLP (57) ABSTRACT

An imaging device has a plurality of predefined regions of interest. The predefined regions of interest may be selected or deselected. Image data from selected regions of interest is transmitted to a host. In some embodiments the regions of interest comprise tiles. A set of selected tiles may be identified by a bit vector. An example application provides a digital camera configured to provide predefined regions of interest. The camera may be configured to permit a host to select or deselect the regions of interest.

27 Claims, 7 Drawing Sheets

EFFICIENT SELECTION AND APPLICATION OF REGIONS OF INTEREST IN DIGITAL IMAGING

FIELD OF INVENTION

The invention relates to digital imaging devices, such as cameras, and to apparatus that uses cameras or other imaging devices in applications. The invention has application, for example, in pattern recognition systems and other systems that perform automated analysis of digital images.

BACKGROUND

Image processing systems may have one or more digital cameras that acquire image data and transmit the image data to a processor over suitable data communication channels. For example, a control system for an industrial robot may include a camera that acquires an image showing a part. The control system may process the image to determine the location and orientation of the part. The control system may then cause the robot to perform an action in a manner based on the location and orientation of the part. Similarly, a control system for a wire bonding machine may comprise a camera that acquires an image of a microchip. The control system may process the image to determine a position and orientation of the microchip. The control system may then operate the wire bonding machine to bond wires to specific locations on the chip. These are but two examples of imaging control systems.

Some cameras are configured in a manner that permits a user to define a region of interest within a digital image. The camera may be operated in such a manner that only data representing the portion of an image within the region of interest is output by the camera. This is useful because, in some applications only a portion of an image is required for image processing. Sending a portion of an image may permit the acquisition rate to be increased in some embodiments. Sending a portion of an image may reduce the amount of data being sent over a bus or other data communication channel in some embodiments. This, in turn, can allow more cameras to share the same data communication channel.

It is typically cumbersome to define a region of interest. The position and boundary of the region of interest must be specified. At a processor it can be necessary to allocate memory to provide a buffer of sufficient size to receive the image data. An application that processes data from such a camera typically requires significant custom programming to properly define a region of interest and to interpret data provided by the camera.

The inventors have recognized a need for efficient cost effective methods and apparatus in which a digital imaging device is configurable to send data for only one or more selected regions of interest. The inventors have recognized a particular need for such methods and apparatus that can be applied in industrial settings such as automated manufacturing.

SUMMARY OF THE INVENTION

This invention provides image capture devices (of which cameras are one example) and methods and apparatus for configuring an image capture device to output regions of interest from within a full image. One aspect of the invention provides a camera which has a number of pre-defined regions of interest. The regions of interest are smaller than a full image. A controller in the camera is configured to receive instructions in a compact syntax for identifying selected ones of the regions of interest and subsequently cause the camera to acquire and transmit image data for the selected regions of interest. Image data for regions not included in any regions of interest is not transmitted in some embodiments.

In some embodiments, an array of pixels of a digital imaging device is logically divided into predefined regions, which may be called tiles. A controller of the digital imaging device is configurable to select or deselect individual ones of the tiles. An identifier may be assigned to each tile. The identifier may be a number. A desired subset of selected tiles may be specified, for example, by a bit vector in which each bit in the vector maps to a corresponding tile. Enabling a bit in the bit vector will cause the tile corresponding to the enabled bit to be selected.

In some embodiments, the tiles make up a static, regularly-spaced array. Having tiles that are not static or are irregularly spaced does not make the invention impossible to implement, only more complicated.

An imaging device and host system may be connected by a suitable data bus. In some embodiments, the imaging device and/or host system are configured to perform bandwidth negotiation prior to transmitting image data for selected tiles. The amount of bandwidth required depends on, the number of pixels transmitted, and the pixel format and desired frame rate of the digital imaging device.

Where the pixel format and frame rate of the digital imaging device is constant, the amount of bandwidth required will directly correlate with the number of pixels being transmitted, which depends, in turn, on the number of selected tiles.

In one embodiment, the amount of bandwidth is renegotiated when the number of selected tiles is modified. This embodiment ensures optimal bandwidth usage. In one embodiment, the amount of bandwidth is renegotiated when the number of selected tiles is increased or decreased by more than a threshold number of selected tiles. Renegotiating bandwidth may be performed more intermittently in order to conserve computing resources.

Another embodiment, involves negotiating a maximum expected bandwidth determined by the maximum expected number of selected tiles. In this embodiment, the output image data may be padded, for example, with 0's when there is too much bandwidth, and may be truncated when there is not enough bandwidth. The number of active tiles in the subset of active tiles can be compared to the maximum expected number of tiles used to configure the bandwidth to insure that the allocated bandwidth will not be exceeded in normal operation.

Another aspect of the invention provides apparatus and methods wherein information identifying the subset of active tiles is embedded into output image data. While this is not mandatory, it is advantageous to facilitate ease of use of the image data.

Further aspects of the invention and features of embodiments of the invention are set out below.

BRIEF DESCRIPTION OF THE DRAWINGS

The accompanying drawings illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
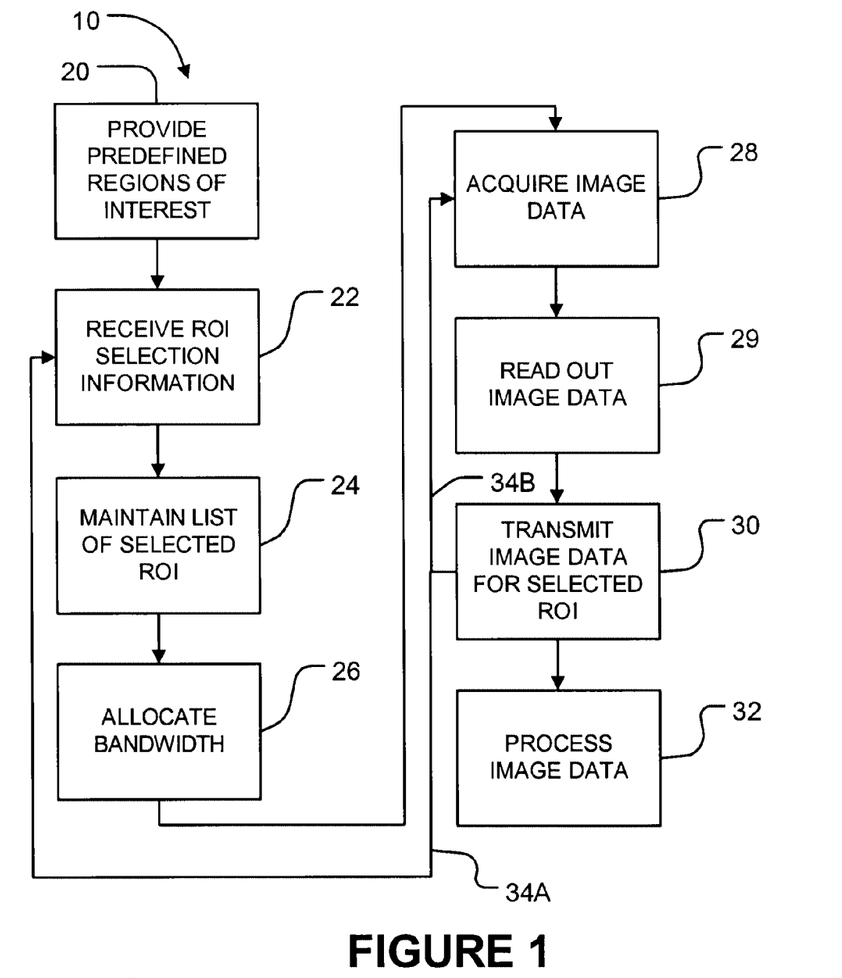
FIG. 1 is a flow chart illustrating a method according to an example embodiment of the invention.
Figure 2:
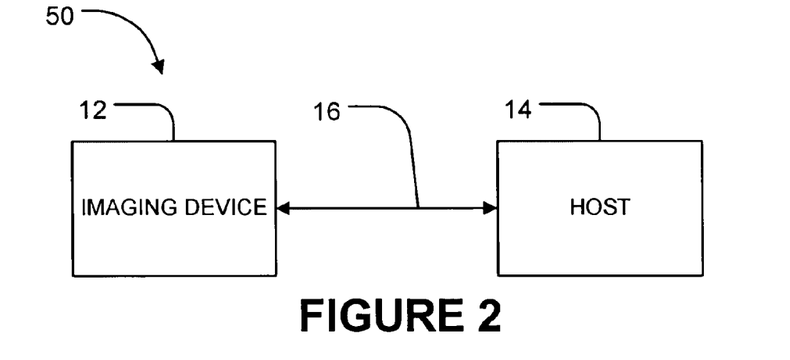
FIG. 2 is a schematic diagram of a system according to an example embodiment of the invention; an imager of a digital imaging device illustrating associations between pixels in the imager and an 8×8 regular array of tiles.

FIG. 1 is a flow chart illustrating a method 10. FIG. 2 illustrates schematically a system 50 that may be used in the practice of method 10. Method 10 is performed in a system, such as system 50 which includes an imaging device 12 and a host 14 coupled by a data link 16. Imaging device 12 generates image data. The image data comprises values associated with pixels in a sensing array.

Imaging device 12 may comprise a charge-coupled device (CCD), active pixel sensor (APS), complementary metal oxide semiconductor (CMOS) sensor or other imaging sensor. Imaging device 12 does not necessarily sense visible light but could sense other things such as infrared light, ultraviolet light, or other electromagnetic radiation outside of the visible part of the spectrum; temperatures, vibration levels, or other measurable physical quantities; chemical concentrations; or the like. Imaging device 12 may comprise another source of image data such as a data processor running a simulation that produces image data. Imaging device 12 may optionally comprise a data processor, image processor or the like that processes raw image data from a suitable sensing array into the image data to be sent to host 14.

In some embodiments, imaging device 12 is capable of generating a large volume of image data. For example, in some embodiments, imaging device 12 is capable of generating values for 1 million or more pixels, in some cases, 6 million or more pixels. Each pixel value may be represented by several bits of digital data. For example, in some imaging devices, each pixel value is represented by 8 to 24 bits of digital data. In some cases, a new set of image data is created periodically at a frame rate which may, for example, be in excess of 1 Hz and in some cases is 30 Hz, 60 Hz, 200 Hz, or more.

Data link 16 may comprise, for example, a serial bus such as an IEEE 1394 (also known as Firewire™) interface, Cameralink™, Ethernet (GigE), USB, another wired data communication interface, an optical data channel, a wireless data channel or the like. In some cases, data link 16 is a bottleneck that limits the performance of system 50. This is especially the case where latency is an issue. For example, consider the case where system 50 comprises a control system for a robot such as a manipulator or the like and host 14 controls actuators that make parts of the robot move in response to image data. In such as system image data from imaging device 12 may be used to provide feedback to motion control algorithms. Delays in transmitting the image data from imaging device 12 to host 14 can limit in the overall performance of the robot.

Host 14 may comprise a data processor, an image processor, which may be implemented in software, hardware, or a combination thereof, a programmed computer such as a personal computer or workstation, an embedded controller for an apparatus or system or a component of an apparatus or system, a collection of programmable controllers or data processors, or the like. In some embodiments, an embedded controller, which may constitute all or part of host 14 or another data processor and one or more imaging devices 12 are tightly coupled. This might be the case, for example where the embedded processor and imaging device(s) 12 are components of a 'smart camera'.

Figure 2A:
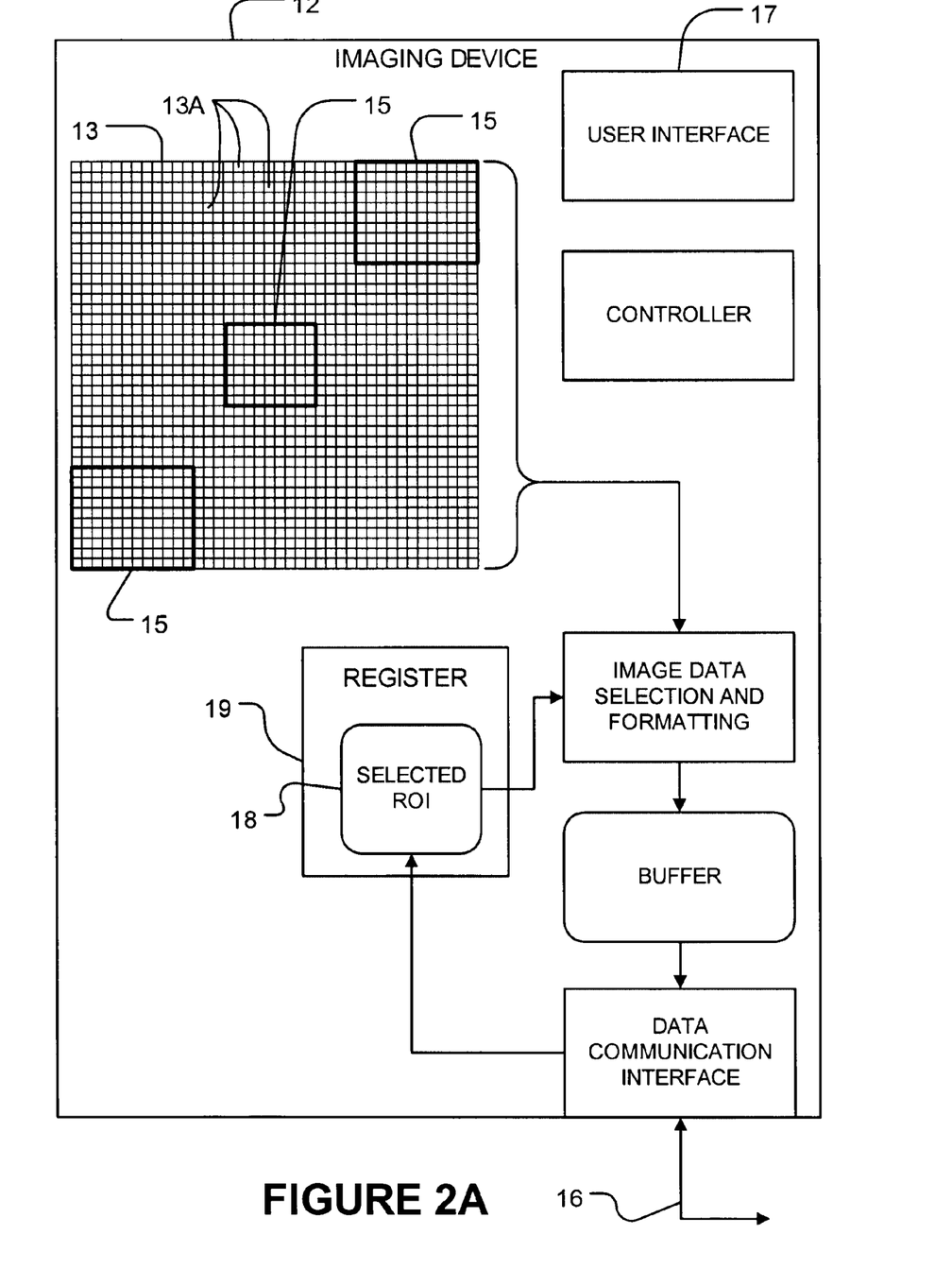
FIG. 2A is a schematic illustration of an imaging device according to an embodiment of the invention.

Block 20 of method 10 comprises providing one or more predefined regions of interest 15 in imaging device 12. Each of the predefined regions of interest includes a subset of pixels in an array 13 of pixels 13A of imaging device 12 (see FIG. 2A). Where there are two or more predefined regions of interest, it is not mandatory that the regions of interest be equal in size, of the same shapes and/or dimensions, or non-overlapping.

It is convenient to provide predefined regions of interest that are regularly-spaced, do not overlap, and are of the same sizes and shapes. In the embodiment illustrated in FIG. 2B, the predefined regions of interest specified in block 20 of method 10 (see FIG. 1) comprise tiles 15A. Tiles 15A comprise rectangular groups of pixels 13A that are non-overlapping and regularly-spaced. In the illustrated embodiment, the entire area of array 13 is covered with non-overlapping tiles 15A. In the illustrated embodiment, each tile 15A contains the same number of pixels. In the illustrated embodiment, each tile 15A has the same shape and dimensions. It is not mandatory that tiles 15A have these attributes in all embodiments.

Figure 2B:
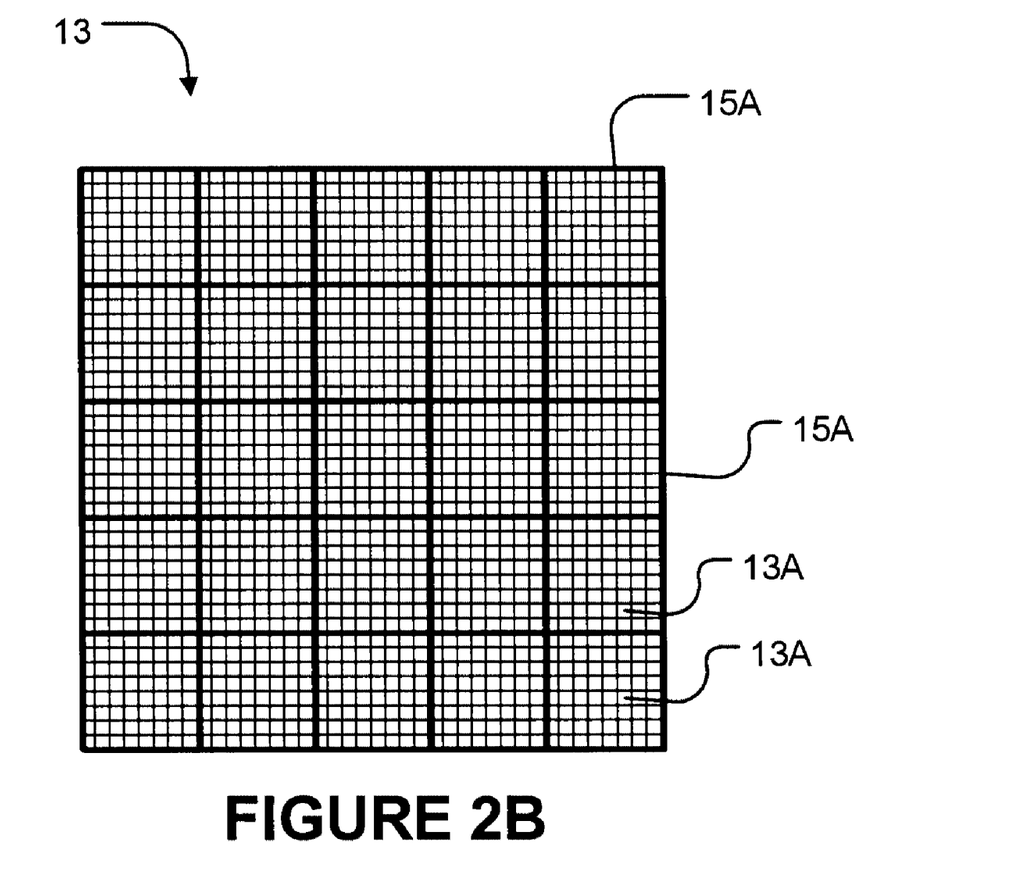
FIG. 2B illustrates an example association between non-overlapping tiles and pixels of an imaging array.

In some embodiments, tiles 15A have widths that are an even multiple of 8. In some embodiments there are between 25 and 256 predefined regions of interest. For example, it can be convenient to divide the image data produced by a camera into an array of tiles that is 8×8 or 16×16. Such embodiments have enough tiles that are large enough that, for many applications, image data for only a few tiles will be required and yet the image data for a few tiles is much smaller than the image data for the entire area of the imaging array. Arrays of tiles having other dimensions such as 7×7 or 10×12 are also possible.

The allocation of pixels 13A to tiles 15A does not need to be reflected in the physical structure of imaging array 13. The pre-allocation of pixels 13A to tiles 15A is a logical relationship. As discussed below, that logical relationship may be embodied in any suitable manner including one or a combination of:

circuitry;
a data record, data structure, data store or the like;
configurable circuitry (such as a field-programmable gate array or the like);
the configuration of array 13 (an array 13 may be constructed so that data from predefined regions of interest can be selectively read from the array); etc.

In preferred embodiments the predefined regions of interest:

are defined statically;
are fixed; and/or
do not require initialization.

In block 22 imaging device 12 receives region selection information identifying one or more of the predefined regions of interest provided in block 20. The region selection information preferably identifies selected regions by way of a compact identifier. The compact identifier may, for example, comprise a number corresponding to the selected region. In one embodiment, the compact identifier for each selected region comprises a logic flag, which may comprise one-bit, for example a position in a bit vector. Enabling the flag selects a corresponding one of the regions. Disabling the flag deselects the corresponding region.

The region selection information may be received at imaging device 12 in various manners. For example:
- region selection information may be entered by way of a user interface 17 of imaging device 12;
- host 14 may transmit region selection information over data link 16 in a message addressed to or otherwise delivered to imaging device 12;
- host 14 may store region selection information in a memory location that is in or accessible to imaging device 12; or
- the like.

The region selection information identifies one or more of the previously-defined regions of interest and, in preferred embodiments, does not contain sufficient information (position, size, shape etc.) to define the regions of interest.

In block 24, imaging device 12 maintains a list or other record 18 of selected tiles 13B. List 18 is maintained within a selected tile register 19 of imaging device 12. As described below, imaging device 12 uses the information about what tiles are selected to assemble image data from the selected tiles (or other regions of interest) for transmission to host 14.

In block 26 method 10 allocates bandwidth for the delivery of image data from imaging device 12 to host 14 over data communication path 16. Block 26 is optional, especially in cases where:
- sufficient bandwidth is pre-allocated,
- data communication path 16 is dedicated solely to communication between host 14 and imaging device 12,
- there is more than sufficient bandwidth for imaging device 12 and any other devices that share data communication path 16.

Allocation of bandwidth may be based upon the number of selected tiles 15A or, more generally, on a number of pixels in selected regions of interest 15 (there is a difference when different regions of interest include different numbers of pixels). In this way sufficient bandwidth for the transmission of image data for the selected tiles 15A is made available while allowing any surplus bandwidth to be allocated for other purposes.

In some embodiments, block 26 comprises allocating bandwidth sufficient for the image data for an expected maximum number of selected tiles 13B. This approach can be advantageous in cases where reducing the overhead of re-allocating bandwidth each time the number of selected tiles 13B changes is more important than minimizing the bandwidth allocated to the transmission of image data from imaging device 12 to host 14.

The mechanism for reserving or allocating bandwidth for image data, if there is such a mechanism, may be provided for in the protocol governing the operation data link 16. Various mechanisms for reserving bandwidth are available commercially and/or known to those of ordinary skill in the art of designing data communication links.

In block 28, imaging device 12 acquires image data. Block 28 may involve opening mechanical or electronic shutters of a camera, acquiring a video frame or the like. Block 28 need not occur at the location in method 10 indicated in FIG. 1. Block 28 may cycle continuously or occur at any time prior to block 29. In some embodiments it is important that image data be recent. In such embodiments, block 28 may occur immediately prior to block 29.

In block 29 imaging device 12 reads out the image data from imaging array 13. In some embodiments, performance is improved by not reading out image data from at least some pixels that are outside of the selected tile(s) 13B. Block 29 may comprise storing the image data in a data buffer or other memory in or accessible to imaging device 12.

In block 30, imaging device 12 transmits image data from the selected tile(s) to host 14 by way of data communication path 16. In some applications, blocks 29 and 30 may be performed simultaneously so that image data that has been read out of imaging array 13 earlier is transmitted to host 14 while other image data is still being read out of imaging array 13.

Image data may be transmitted to host 14 in any suitable format. Some example formats are:
- image-aligned formats;
- tile-aligned formats; and,
- tile-interleaved formats.

In an image-aligned format, data standing for the pixels in the entire image or an entire part of the image is transmitted, only the pixels in selected tiles contain actual values. Data in the image-aligned format corresponding to pixels outside of the selected tiles is set to a placeholder value (for example, zero). In some embodiments the protocol by which data is transmitted over data communication path 16 involves compression. In such embodiments, large contiguous areas within the image data in which the image data is set to the placeholder value can be transmitted very efficiently.

Figure 3A:
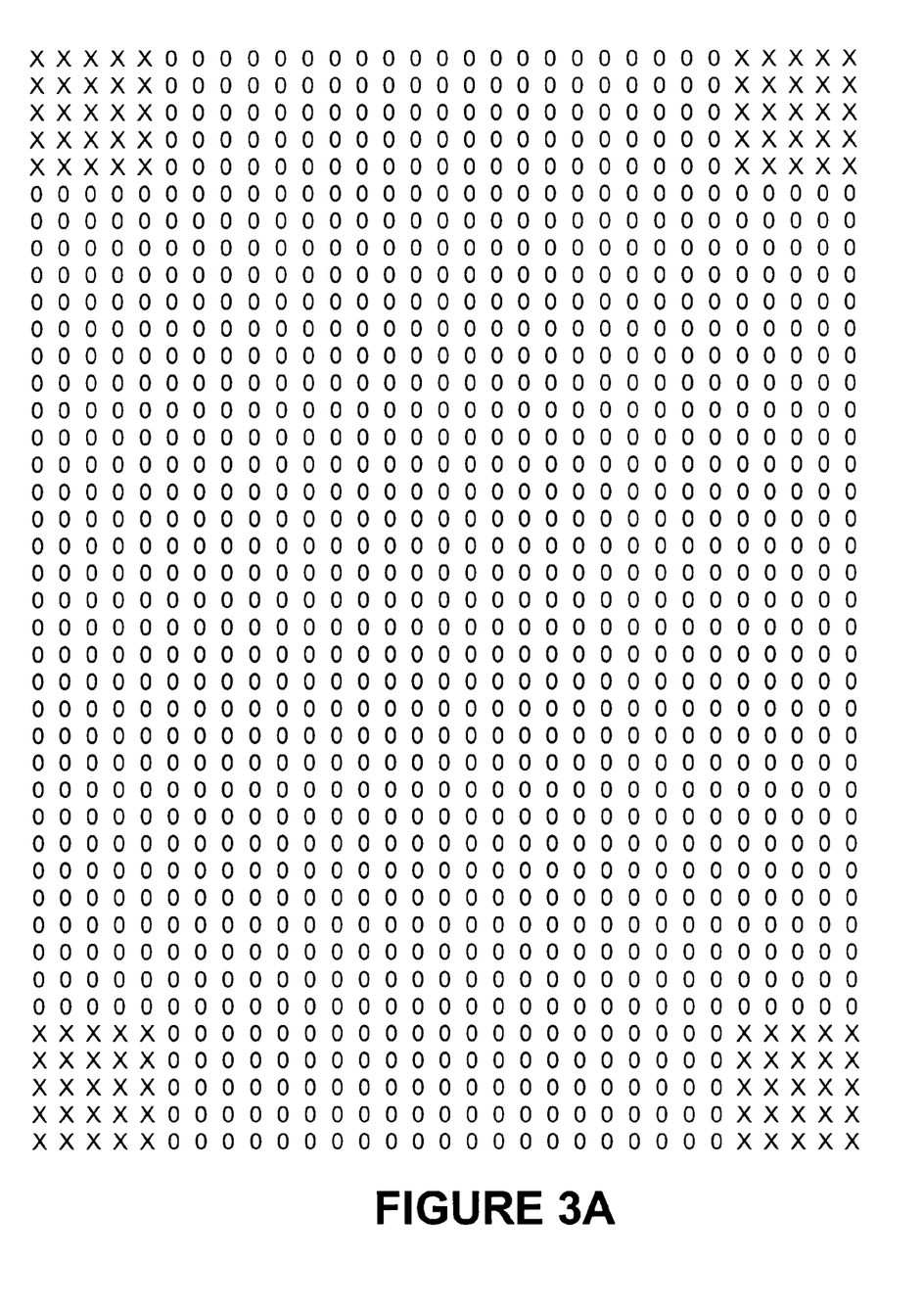
FIGS. 3A, 3B and 3C respectively illustrate image-aligned, tile-aligned and tile-interleaved data formats.

FIG. 3A is an example of a data structure 40 holding image data in an image-aligned format. Data structure 40 has data corresponding to a number of selected regions (corresponding to corners of the imaging array in the illustrated example) and placeholder data in other regions. In FIG. 3A the placeholder data is indicated by "0"s and the image data is indicated by "X"s. The "X"s represent varying image data. FIG. 3A is schematic. In a typical implementation data structure 40 would comprise many more values than are illustrated in FIG. 3A. For example, data structure 40 may have values corresponding to a few hundred, a few thousand or more pixels in each dimension.

In a tile-aligned format, the output image data transmitted to host 14 is made up substantially entirely of data from selected tiles. Data corresponding to non-regions selected regions of the image is not transmitted. Data for different tiles is separated (e.g. the data for different tiles may be sent sequentially). This can introduce latency in cases where the transmission of data for one tile is not commenced until the readout of data for a previous tile is completed and the data for the previous tile has been transmitted.

Figure 3B:
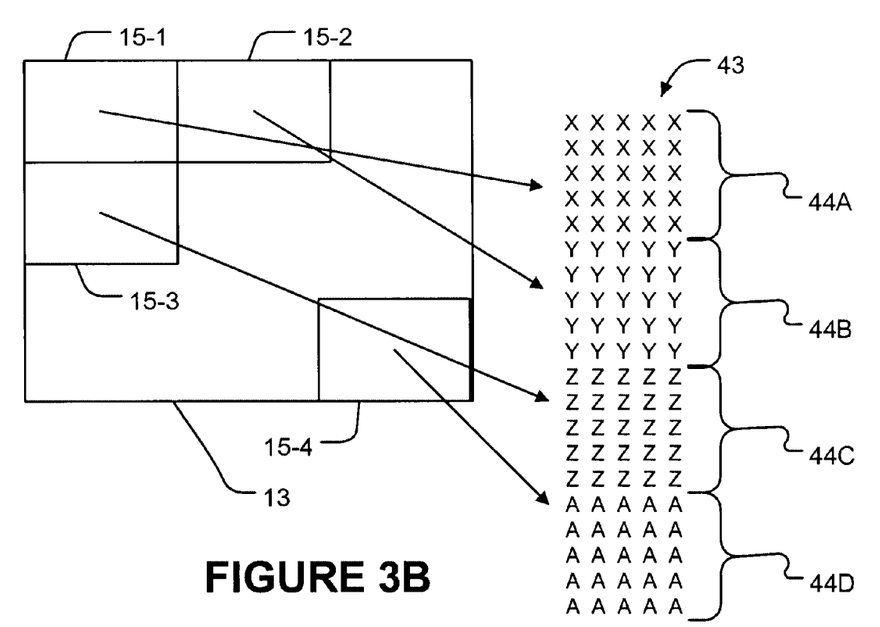

FIG. 3B is an example of a data structure 43 holding image data in an tile-aligned format. Data structure 43 has sections 44A through 44D each containing image data corresponding to one selected region of interest (regions of interest 15-1, 15-2, 15-3 and 15-4 of imaging array 13 in the illustrated example).

In a tile-interleaved format, data is transmitted in row-order but only data from selected tiles is included. Where a range of rows includes pixels belonging to two or more different selected tiles, data from the selected tiles is interleaved. A tile-interleaved format has the advantage of low latency at the cost of somewhat increased complexity in processing the data.

Figure 3C:
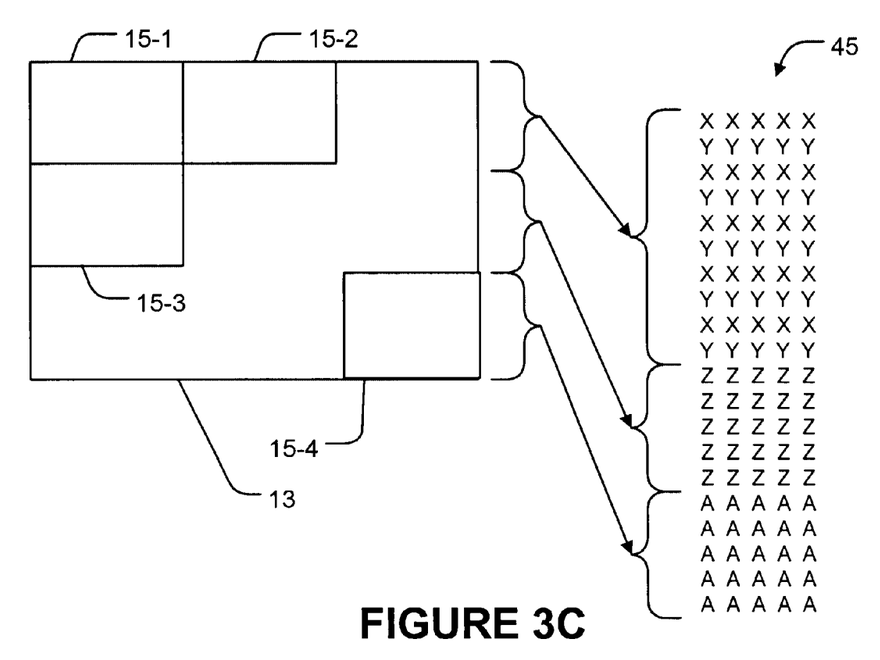

FIG. 3C is an example of a data structure 45 holding image data in a tile-interleaved format. In data structure 45, data is arranged in the same order as it is read out of imaging array 13. This results in rows of any regions of interest that have pixels from the same row of imaging array 13 being interleaved. For example, regions of interest 15-1 and 15-2 are on the same rows of imaging array 13 and so the rows of image data from regions of interest 15-1 and 15-2 are interleaved in data structure 45.

In some embodiments, a variable-sized buffer is allocated at host 14 to receive the image data. The size of the buffer may be allocated to hold the expected image data. In some embodiments, the buffer is allocated by determining the number of selected tiles in each row;

determining the maximum number of selected tiles in any row of tiles;

determining the number of rows containing any selected tiles;

allocating a buffer having a width sufficient to receive the maximum number of selected tiles times the number of columns in each active tile and a height sufficient to receive the number of rows containing selected tiles times the number of rows in each tile.

Incoming image data can then be directed into the buffer. This may be performed by direct memory access (DMA) or any other suitable technology.

In block 32 host 14 processes the image data to provide some result, such as control signals for apparatus controlled by host 14, or the like. Loops 34A and/or 34B can be repeated to transmit fresh image data from imaging device 12 to host 14 at a suitable frame rate.

Example

Figure 4:
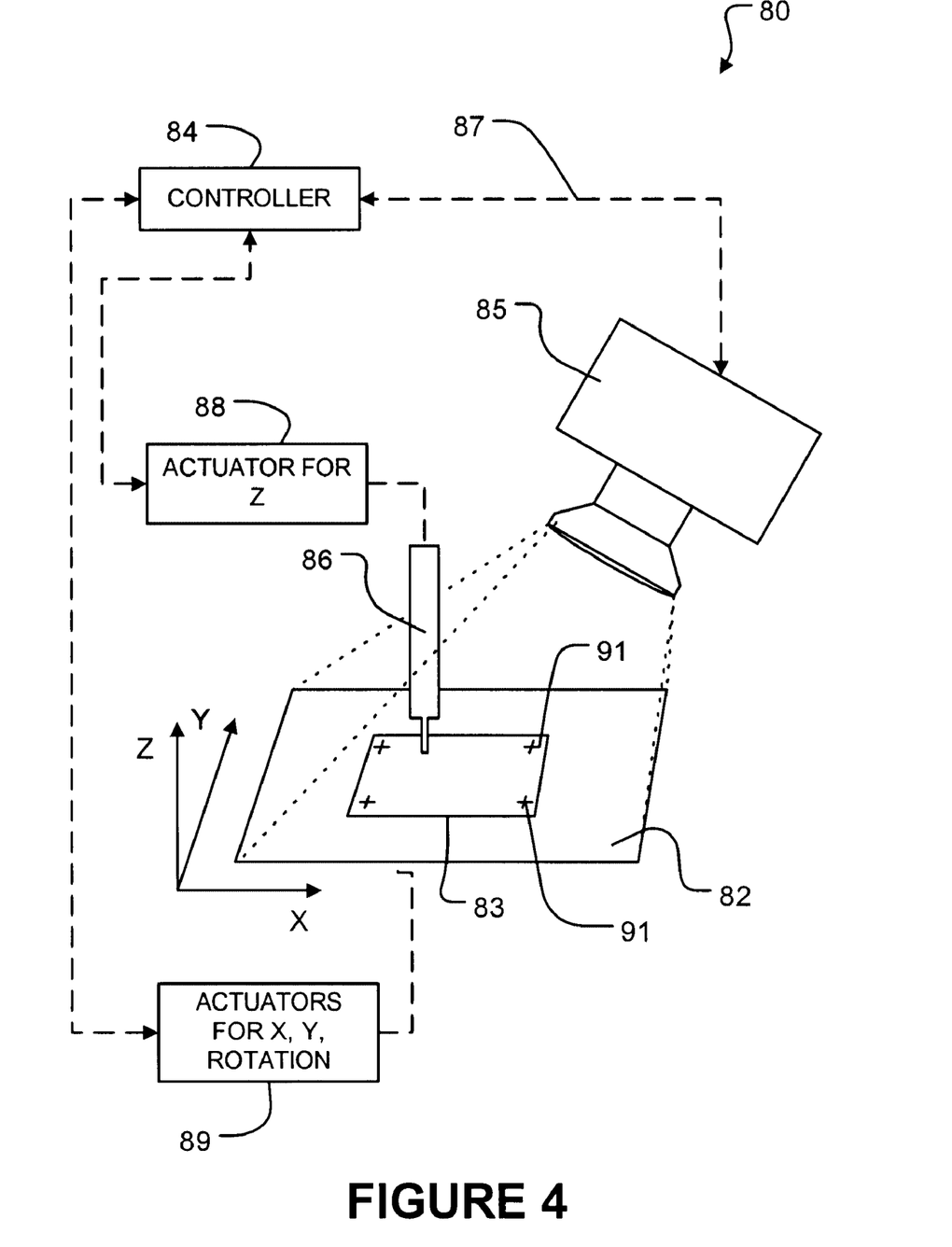
FIG. 4 is a schematic illustration depicting a wire boding machine according to an example implementation of the invention.

FIG. 4 shows a wire-bonding machine 80 according to an example embodiment of the invention. Machine 80 comprises a stage 82 that is movable in X and Y directions and can also be rotated. A VLSI chip 83 is mounted on stage 82 and is imaged by a camera 85. A wire-bonding tip 86 that is movable in the Z direction by an actuator 88 controlled by controller 84 is supported over chip 83. Controller 84 controls X-Y motion and rotation of stage 82 in response to image data received from camera 85 over bus 87 by suitably controlling actuators 89.

When chip 83 is first placed on stage 82 the precise location and orientation of chip 82 is not known. Controller 84 first must ascertain the position and orientation of chip 82 so that it can accurately position tip 86 over specific features on chip 83. For this purpose, controller 84 obtains from camera 85 an image of chip 83. It is not necessary to obtain image data for the entire chip 83 since the position and orientation of chip 82 can be determined by observing registration marks 91 that are present on chip 82 (for example on corners of chip 82, as shown). Controller 84 sends to camera 85 region select information selecting only certain predefined regions of the image covering areas where registration marks 91 corners of chip 82 are expected to be seen (e.g. regions of interest that include image data for the corners of chip 82).

Camera 85 acquires an image and stores image data from the selected regions of interest in a buffer. As soon as there is sufficient image data in the buffer, camera 85 begins transmitting the image data to controller 84. Only image data for the selected predefined regions of interest is transmitted to controller 84. Advantageously, the image data is transmitted in an image-aligned or tile-interleaved format so that data transmission can begin before image data for any region of interest has been read out of the imaging array of camera 85.

Controller 84 receives the image data, if necessary, identifies image data corresponding to individual regions of interest, and processes the image data using any suitable image-processing techniques to identify and measure locations of registration features 91 in the image data. From the locations of the registration features, controller 84 computes the position and orientation of chip 82. The position and orientation data can then be used to determine a sequence of motions of actuators 89 to bring tip 85 into alignment over various features on chip 82 and to actuate actuator 88 and other systems to perform wire bonding or other actions on chip 82. For example, wires may be bonded to connect bonding pads on chip 82 to bonding pads on a chip package (not shown).

Example

Figure 5:
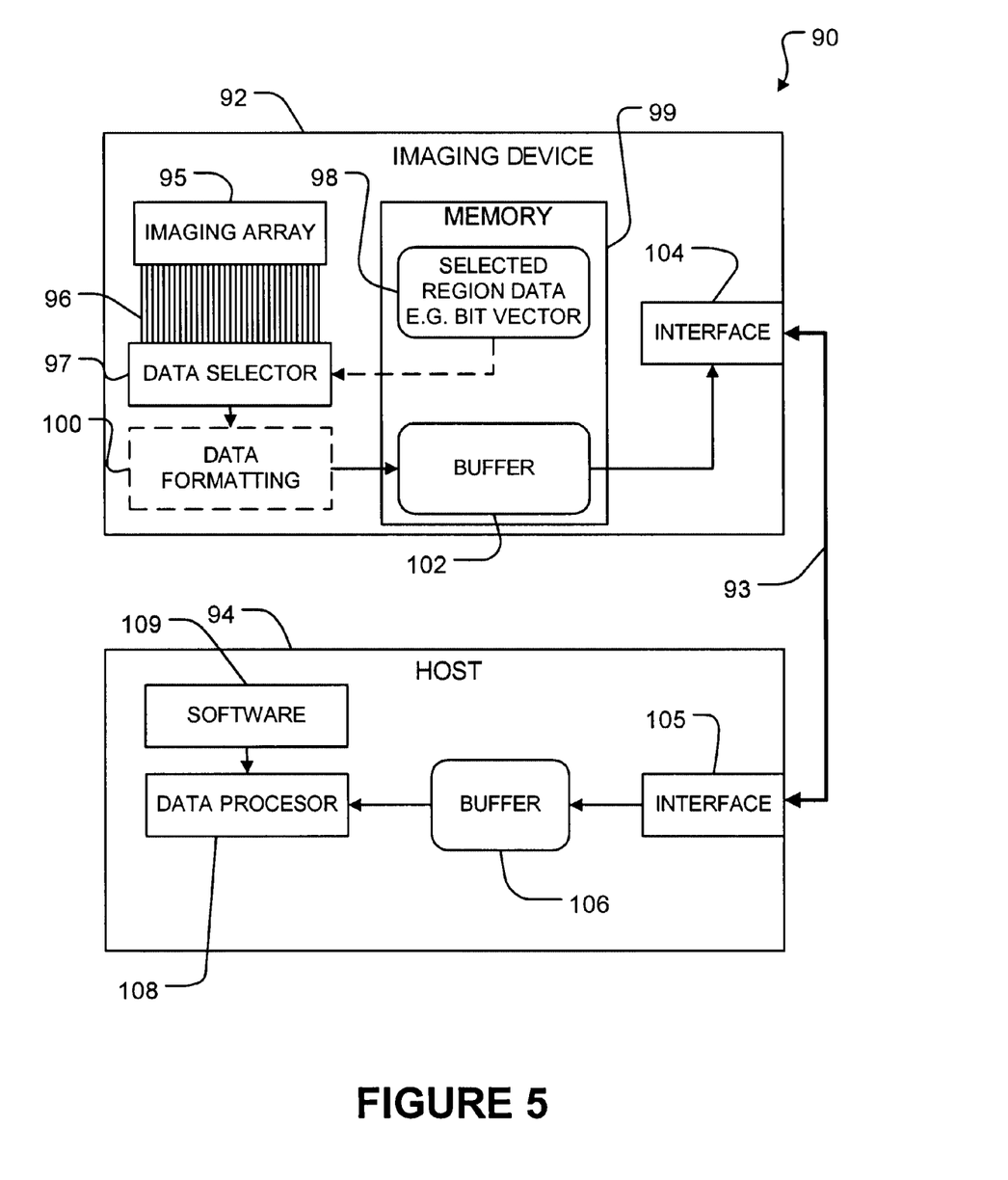
FIG. 5 is a block diagram illustrating a system according to another example implementation of the invention.

FIG. 5 shows apparatus 90 according to an example embodiment of the invention. Apparatus 90 comprises an imaging device 92, for example a digital camera, connected to a host 94 by a data connection 93. Imaging device 92 has an imaging array 95 having image data output lines 96. A data selector 97 receives data from image output lines 96 and selects data corresponding to selected regions of interest. Data selector 97 determines which predetermined regions of interest have been selected by reading selected region data such as a bit vector 98 in a memory 99. The selected region data identifies selected regions. In the illustrated embodiment, one bit of bit vector 98 corresponds to each predefined region available for selection. The bit vector serves as a set of flags. A region is selected if the corresponding bit of bit vector 98 is enabled and is not selected if the corresponding bit of bit vector 98 is not selected.

Imaging device 92 has an optional data formatting stage 100 that, for example, collects image data for individual selected regions so that the image data can be inserted into a buffer in a tile-aligned format or inserts placeholder values where the image data is desired to be provided in an image-aligned format. A buffer 102 receives image data (as formatted by formatting stage 100). An interface 104 transmits the image data from buffer 102 across data connection 93 to host 94. At host 94 the received image data is taken in at a suitable interface 105, stored in a buffer 106 and is available to a data processor 108 that works with the image data under the control of instructions provided by software 109.

In any of the embodiments described herein, information identifying the selected region(s) of interest may be transmitted with image data being sent by the imaging device to the host. For example, the selected regions of interest may be embedded in a header or trailer attached to the image data. In such embodiments, the close association of the information identifying the selected region(s) of interest and the image data may facilitate later processing or interpretation of the image data. Information identifying the selected region(s) of interest may be associated with or linked to the corresponding image data in other ways such as by the provision of a pointer, data structure or the like that indicates what region(s) of interest were selected for a given image data.

Data selector 97 and data formatting stage 102 may be provided by any suitable technology including, without limitation one or more of:

logic circuits;

configurable logic, such as a field-programmable gate array (FPGA) configured to perform the functions defined above; and a suitably programmed data processor such as a microprocessor, image processor, graphics processor, digital signal processor or the like.

In the illustrated embodiment, host 94 can control the content of memory 99 either directly or indirectly. By storing different bit vectors 98 in memory 99, host 94 can control which regions of interest are selected at imaging device 92. This may be done in response to software instructions being executed on data processor 108 of host 94. Thus, host 94 can direct imaging device 92 to provide image data for a first group of one or more regions of interest to enable host 94 to perform a first task (such as determining the orientation and location of a chip by visualizing reference marks on the chip, for example) and to subsequently shift to provide image data for a second group of one or more regions of interest to enable host 94 to perform a second task (such as positioning a wire bonding tip 85 over a specific feature on the chip, for example).

It can be appreciated that selected embodiments of the invention can be applied to advantage in various situations. For example, suitable embodiments may be applied in situations where one or more of the following conditions exist (although the invention is by no way limited to situations in which these conditions exist):

- Available bandwidth for carrying image data to a host is limited—data transmission can be reduced by transmitting data for required regions of interest only.
- It is desired to operate an imaging array at an increased frame rate for better temporal resolution or reduced latency—some imaging devices can be operated at greater frame rates where the number of rows of image data being read out are reduced. In some embodiments, the digital imaging device may be configured to operate at an increased frame rate or rates when selected regions of interest occupy a reduced number of rows.
- It is desired to reduce latency—which can be done by selecting and transmitting only image data from regions of interest.
- It is desired to change which regions of interest are selected frequently or with low overhead.
- It is desired to provide an imaging device in which regions of interest may be defined easily and with low overhead.
- It is desired to take advantage of the increased performance of some sensors, such as certain CMOS sensors, attainable by reducing the number of columns that are read.

From the foregoing description and the accompanying drawings it can be seen that the invention may be embodied, without limitation, in any of:

- an imaging device such as a camera;
- a system which includes an imaging device; and,
- a method for configuring, selecting and/or using regions of interest in image data.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

- It is not mandatory that predefined regions of interest are rectangular. Regions of interest could have other regular shapes such as circular or could have more complicated bound shapes designed for specific applications;
- It is not mandatory that image data corresponding to every pixel of an imaging array be included in a predefined region of interest. In some embodiments, regions of interest are predefined only for some parts of an image.
- It is not mandatory that predefined regions of interest do not overlap.

Accordingly, the scope of the invention is to be construed in accordance with the substance defined by the following claims.

What is claimed is:

1. An imaging device comprising:
    an imaging array comprising a plurality of pixels;
    an interface coupled to receive image data from the imaging array and forward the image data over a data link;
    a data store containing region selection information for each of a plurality or predefined regions of interest, the region selection information indicating whether each of the predefined regions of interest is enabled or disabled, the regions of interest corresponding to subsets of the pixels of the imaging array;
    a data selection stage configured to selectively make available to the interface for forwarding over the data link image data corresponding to regions of interest indicated by the region selection information as being enabled,
    wherein the interface is configured to:
        receive new region selection information comprising a plurality of flags corresponding to the plurality of predefined regions, each flag indicating whether one of the predefined regions of interest is enabled or disabled, and
        reset the region selection information according to the new region selection information in response to receiving the new region selection information.

2. An imaging device according to claim 1 wherein the new region selection information comprises a bit vector with one bit associated with each of the predefined regions.

3. An imaging device according to claim 1 comprising a controller configured to request an amount of bandwidth on the data link wherein the amount of bandwidth is based upon a number of the predefined regions indicated as being enabled.

4. An imaging device according to claim 1 wherein the plurality of predefined regions include rectangular tiles that are collectively associated with substantially all of the pixels of the imaging array.

5. An imaging device according to claim 1 wherein the association between one of the predefined regions and the corresponding pixels of the imaging array is fixed.

6. An imaging device according to claim 1 wherein the plurality of predefined regions of interest are rectangular and are equal in size.

7. An imaging device according to claim 6 wherein a width of each region of interest in pixels is evenly divisible by eight.

8. An imaging device according to claim 1 where there are in the range of 25 to 256 predefined regions of interest.

9. An imaging device according to claim 1 configured to set the region selection information to match the new region selection information received by way of the data link.

10. An imaging device according to claim 9 in combination with a host in data communication with the imaging device by way of the data link, wherein the host is configured to send region selection information to the imaging device and to receive image data from the imaging device.

11. A method for acquiring image data, the method comprising:
    providing a plurality of predefined regions of interest each corresponding to a subset of pixels of an imaging array;
    receiving region selection information comprising a plurality of flags corresponding to the plurality of predefined regions, each flag indicating whether one of the predefined regions of interest is selected;

acquiring an image using the imaging array;

reading image data from the imaging array and from the image data selecting image data corresponding to the one or more of the predefined regions of interest identified as selected by the region selection information; and, transmitting the selected image data to a host.

12. A method according to claim 11 wherein the region selection information comprises a bit vector with one bit associated with each of the predefined regions of interest.

13. A method according to claim 11 comprising allocating a bandwidth for transmission of the selected image data based at least in part on a number of the predefined regions of interest that are selected.

14. A method according to claim 11 wherein transmitting the selected data comprises transmitting the selected data in an image-aligned format.

15. A method according to claim 14 wherein transmitting the selected data comprises compressing the selected data.

16. A method according to claim 11 wherein transmitting the selected data comprises transmitting the selected data in a tile-aligned format.

17. A method according to claim 16 wherein transmitting the selected data comprises compressing the selected data.

18. A method according to claim 11 wherein transmitting the selected data comprises transmitting the selected data in a tile-interleaved format.

19. A method according to claim 18 wherein transmitting the selected data comprises compressing the selected data.

20. A method according to claim 18 comprising commencing transmitting the selected image data prior to completing reading all of the image data corresponding to the predefined regions of interest identified as selected by the region selection information from the imaging array.

21. A method according to claim 14 comprising commencing transmitting the selected image data prior to completing reading all of the image data corresponding to the predefined regions of interest identified as selected by the region selection information from the imaging array.

22. A method according to claim 11 comprising suppressing reading from the imaging array rows or columns of image data for which no pixels correspond to any of the predefined regions of interest identified as selected by the region selection information.

23. An imaging device according to claim 1 wherein the interface is configured to forward over the data link information identifying the predefined regions corresponding to image data made available to the interface for forwarding over the data link.

24. An imaging device according to claim 1 wherein the data selection stage is configured to make available to the interface for forwarding over the data link image data corresponding part of one of the predefined regions indicated as being enabled before the interface has received image data from the imaging array for all of the one region of interest.

25. An imaging device according to claim 24 wherein the data selection stage is configured to make available to the interface for forwarding over the data link image data corresponding to the predefined regions indicated as being enabled in image-aligned format.

26. An imaging device according to claim 24 wherein the data selection stage is configured to make available to the interface for forwarding over the data link image data corresponding to the predefined regions indicated as being enabled in tile-interleaved format.

27. A method according to claim 11 comprising transmitting information identifying predefined regions identified as selected by the region selection information to the host.

* * * * *